(12) United States Patent
Jones et al.

(10) Patent No.: US 9,043,417 B1
(45) Date of Patent: May 26, 2015

(54) DETECTING SPAM ACROSS A SOCIAL NETWORK

(75) Inventors: Christopher Jones, San Francisco, CA (US); Stephen Kirkham, San Francisco, CA (US)

(73) Assignee: Google Inc., Mountain View, CA (US)

( * ) Notice: Subject to any disclaimer, the term of this patent is extended or adjusted under 35 U.S.C. 154(b) by 227 days.

(21) Appl. No.: 13/545,848

(22) Filed: Jul. 10, 2012

Related U.S. Application Data

(60) Provisional application No. 61/569,948, filed on Dec. 13, 2011.

(51) Int. Cl.
H04L 12/58 (2006.01)
H04L 29/06 (2006.01)
G06F 21/55 (2013.01)

(52) U.S. Cl.
CPC .............. H04L 51/32 (2013.01); H04L 51/12 (2013.01); H04L 63/1416 (2013.01); G06F 21/55 (2013.01)

(58) Field of Classification Search
None
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 8,479,287 B2 * | 7/2013 | Chen et al. | 726/22 |
| 8,676,909 B2 * | 3/2014 | Guyot et al. | 709/206 |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |

(Continued)

FOREIGN PATENT DOCUMENTS

WO WO02079984 10/2002

OTHER PUBLICATIONS

Adamic et al., "A Social Network Caught in the Web," Internet Journal, First Monday, Jun. 2, 2003, vol. 8, No. 6, pp. 1-22.

(Continued)

Primary Examiner — Mohamed Ibrahim
(74) Attorney, Agent, or Firm — Patent Law Works LLP

(57) ABSTRACT

A system and method for detecting spam across a social network using a spam detector is disclosed. The system comprises a post receiving module, a fingerprint generator, a fingerprint comparison module, fingerprint storage and a spam response module. A comment is received by the post receiving module and a fingerprint is generated by the fingerprint generator using the comments. The fingerprint is compared to other fingerprints previously generated and stored by the fingerprint comparison module. If the fingerprint matches any previously stored fingerprints, it is assumed to be spam and processed accordingly by a spam response module. If the fingerprint does not match any previously stored fingerprints, it is posted in the social network.

25 Claims, 6 Drawing Sheets

(56) References Cited

U.S. PATENT DOCUMENTS

| | | | |
|---|---|---|---|
| 2007/0173236 | A1 | 7/2007 | Vishwanathan et al. |
| 2007/0248077 | A1 | 10/2007 | Mahle, Jr. et al. |
| 2008/0056475 | A1 | 3/2008 | Brannick et al. |
| 2008/0192656 | A1 | 8/2008 | Vagelos |
| 2011/0098156 | A1 | 4/2011 | Ng et al. |
| 2013/0018823 | A1* | 1/2013 | Masood .................. 706/12 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

DETECTING SPAM ACROSS A SOCIAL NETWORK

CROSS REFERENCE TO RELATED APPLICATIONS

This application claims priority under 35 USC §119(e) to U.S. Application No. 61/569,948, entitled "Detecting Spam Across a Social Network" filed Dec. 13, 2011, the entirety of which is herein incorporated by reference for all purposes.

BACKGROUND

The present disclosure relates to social networks and the presentation of content. In particular, the present disclosure relates to systems and methods for detecting spam across a social network.

Spam is a rampant problem across the Internet. Spam (e.g., junk or unsolicited bulk messages) is generally identical messages sent to numerous recipients who did not request it. While spam is typically thought of in the e-mail context, it is also becoming widespread on social networks. A spammer can attempt to elicit random users to help monetize. The spammer makes a large number of identical or nearly identical posts. This can be done by email, online service pages, or comments on a blog or a social network. A relevant aspect to a spammer is coverage. The greater the number of unique users that view a spam post, the greater the number of possible monetize-able events that may occur. That is, random users responding to or otherwise following the instructions in a spam post result in the spammer accruing money.

Some social networks allow public posting. A user can comment on a public post. Spammers can also comment on a post.

SUMMARY

Some social networks also find and identify popular content shared with a social network. This surfaces the popular public posts in the stream of a user as well as allows users to view the trending posts. This has led to spammers taking advantage of the very high number of views the comments of such posts will receive. In some examples, the specification describes a system and method for detecting spam across a social network. The system includes a spam detector that comprises a fingerprint generator, a comparison module and a response module. The fingerprint generator receives comments and produces a fingerprint from a comment. The comparison module receives the fingerprint from the fingerprint generator and at least one previously received fingerprint. The comparison module generates an indication of whether a comment is spam. The response module receives the comment and the indication from the comparison module of whether the comment is spam. The response module processes the comment. A comment is received and a fingerprint is generated using the comments. The fingerprint is compared to other fingerprints previously generated and stored. If the fingerprint matches any previously stored fingerprints, it is considered to be spam and processed accordingly. If the fingerprint does not match any previously stored fingerprints, it is posted in the social network.

The specification also includes a method, executing on one or more computing devices, for detecting spam across a social network that comprises receiving a comment, generating a fingerprint from the comment, determining whether the comment is spam using the fingerprint and a previously stored fingerprint, providing the comment if the comment is not spam and processing the comment as spam if the comment is spam.

The present disclosure is particularly advantageous in a number of respects. First, the spam detector prevents comments that are spam from being posted in a social network. Second, the spam detector can be used with other signals to improve the accuracy of identifying spam. Third, the spam detector can be used for any user generated content to reduce or eliminate spam.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
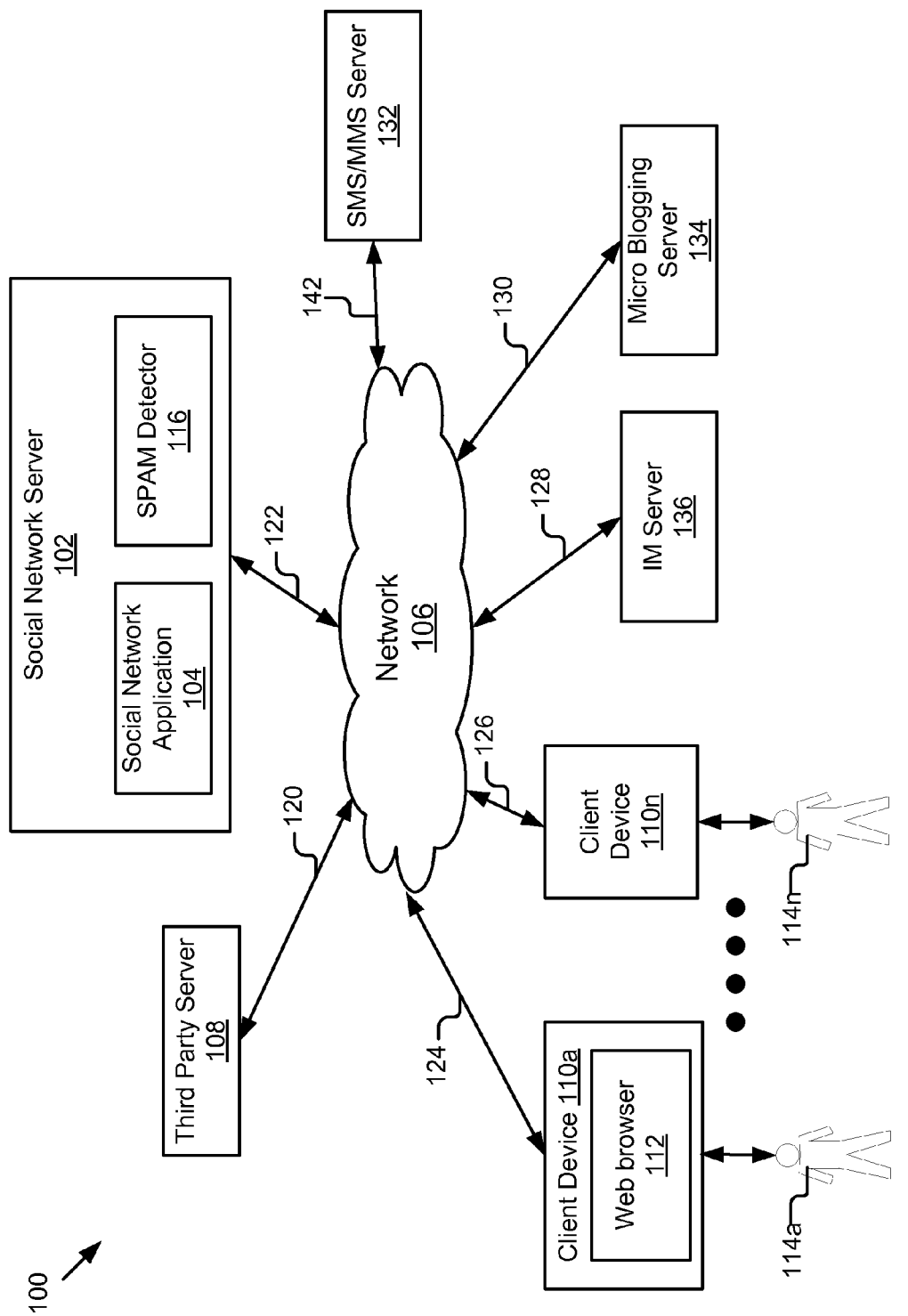
FIG. 1 is a block diagram illustrating a system for detecting spam across a social network according to some embodiments of the present disclosure.

FIG. 1 illustrates a block diagram of some embodiments of a system 100 for detecting spam across a social network. The illustrated system 100 for detecting spam across a social network includes a social network server 102 having a social network application 104 and a spam detector 116, a network 106, a third party server 108, one or more client devices 110a-110n (also referred to herein individually and collectively as 110) that are accessed by users 114a-114n (also referred to herein individually and collectively as 114), an SMS/MMS server 132, a micro blogging server 134 and a IM server 136. In the illustrated embodiment, these entities are communicatively coupled via the network 106. Although only two client devices 110 are illustrated, it should be understood that one or more client devices 110 are available to one or more users 114. Moreover, while the present disclosure is described below primarily in the context of detecting spam across a social network, the present disclosure is applicable to detecting and removing spam in other systems and data.

While the present disclosure will now be described in the context of a social network, it should be understood that the principles of the present disclosure could be applied to any service that collects and posts user generated content. For example, any third party systems that accept comments, reviews, posts, tips, check-ins, comments on WordPress blogs, etc. may use the spam detector 116 described below.

The client devices 110a, 110n in FIG. 1 are used by way of example. While FIG. 1 illustrates two client devices, the present disclosure applies to numerous different system architectures having one or more client devices 110. Furthermore, while only one network 106 is coupled to the social network server 102, the third party server 108, the client devices 110a, 110n, the SMS/MMS server 132, the micro blogging server 134 and the IM server 136, in practice single or multiple networks 106 can be connected to the entities. Furthermore, while only one third party server 108 is shown, the system 100 could include one or more third party servers 108.

While shown as stand-alone server in FIG. 1, in other embodiments all or part of the social network server 102 could be part of the third party server 108 that is connected to the network 106. The social network server 102 interacts via signal line 122 and the network 106 with the third party server 108, client devices 110a-110n, the SMS/MMS server 132, the micro blogging server 134 and the IM server 136. The social network server 102 includes the social network application 104 and the spam detector 116. In another embodiment (not shown), the spam detector 116 is stored on a third party server 108, which is connected to the network 106 via signal line 120. In yet another embodiment, the spam detector 116 is stored on a user device 110a-110n, which is connected to the network 106 via signal line 124, 126. It should be understood that spam detector 116 can be stored in any combination of the devices and servers. The operation functionality of spam detector 116 is described in more detail below with reference to FIGS. 2B-4B.

The client device 110a-110n can be a computing device that includes a memory and a processor, for example a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network.

In one embodiment, the social network server 102 cooperates with the client device 110 to generate and present user interfaces for showing posts, sending messages and interacting with other users of the social network. The social network server 102 also collects data from these other systems and components in system 100 to determine information about a user's context, state and interests. The social network server 102 is also coupled for communication with the client device 110a, which is connected to the network 106 via signal line 124. The user 114a interacts with the client device 110a. Similarly, the client device 110n is coupled to the network 106 via signal line 126 and the user 114b interacts with the client device 110n. It should be understood that the social network server 102 can be stored in any combination of the devices and servers, or in only one of the devices or servers. The SMS/MMS server 132, the micro blogging server 134 and the IM server 136 are coupled to the network 106 by signal lines 142, 130 and 128, respectively for communication with the social network server 102.

In some embodiments, the social network server 102, the third party server 108, the micro-blogging server 134, the SMS/MMS server 132, and the IM server 136 are hardware servers including a processor, memory, and network communication capabilities.

The social network server 102 as noted above includes a social network application or software 104. Although only one social network server 102 is shown, it should be understood that multiple social network servers may be present. A social network is any type of social structure where the users are connected by a common feature. The common feature includes friendship, family, work, an interest, etc. The common features are provided by one or more social networking systems, such as those included in the system 100, including explicitly-defined relationships and relationships implied by social connections with other online users, where the relationships form a social graph 118 (see FIG. 2A). In some examples, the social graph 118 can reflect a mapping of these users 114 and how they are related. The phrase social graph as used herein encompasses its plain and ordinary meaning including, but not limited to, a file that includes the relationships between the users in a social network. For example, users can be friends, acquaintances, have business relationships, one user can follow another user, one user can subscribe to another user, etc.

Furthermore, it should be understood that social network server 102 and social network application 104 are representatives of one social network and that there are multiple social networks coupled to the network 106, each having its own server, application and social graph. For example, a first social network is more directed to business networking, a second is more directed to or centered on academics, a third is more directed to local business, a fourth is directed to dating and others of general interest or a specific focus.

The network 106 is a conventional type, wired or wireless, and may have numerous different configurations such as a star configuration, token ring configuration or other configurations. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or include portions of a telecommunication network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

Example Social Network Servers

Figure 2A:
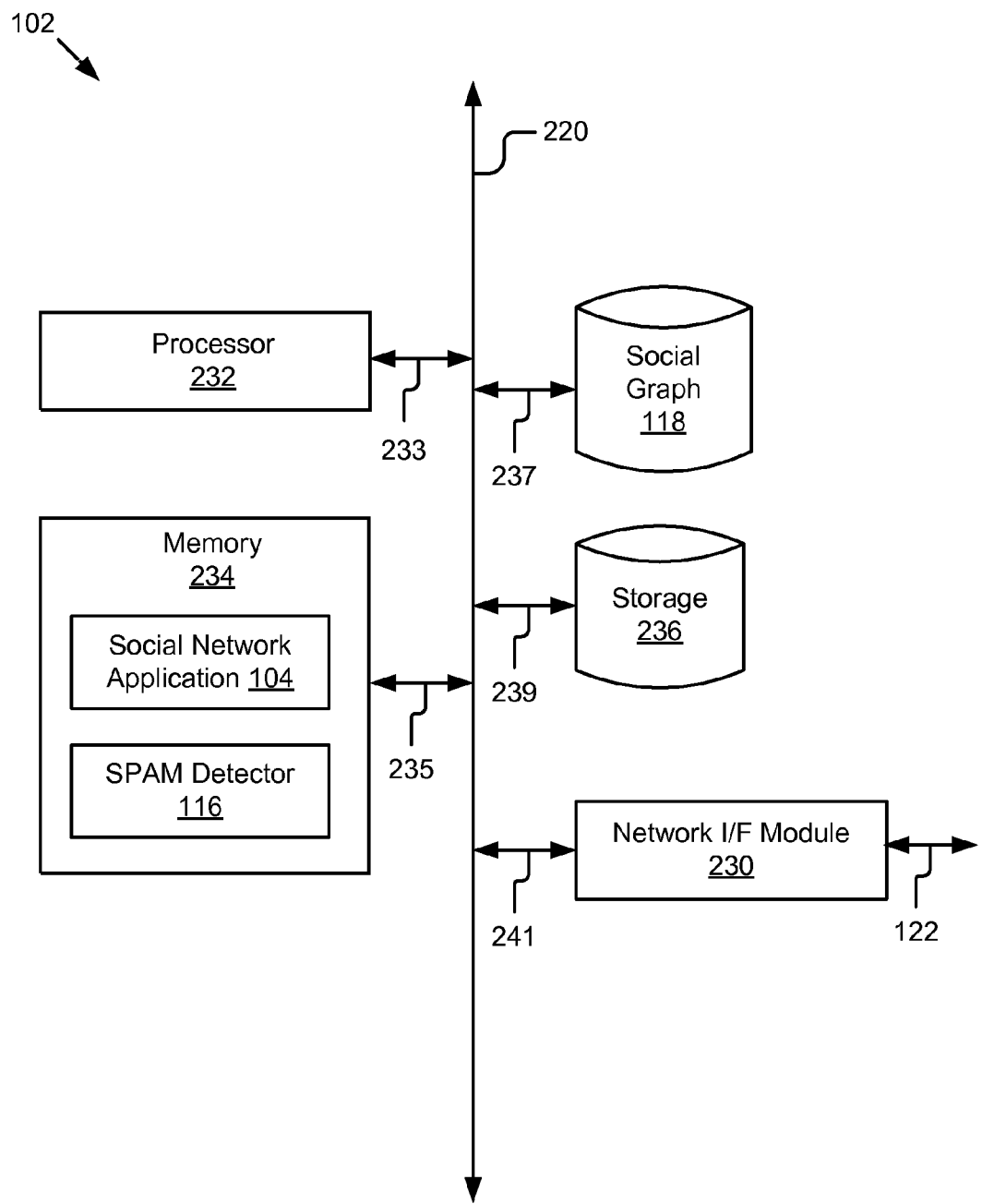
FIG. 2A is a block diagram illustrating hardware implementing the functionality of detecting spam across a social network according to some embodiments of the present disclosure.

Referring now to FIG. 2A, the hardware implementing the functionality of detecting spam across a social network is shown in more detail. FIG. 2A is a block diagram of some embodiments of the social network server 102. In these embodiments, the social network server 102 comprises: a network interface (I/F) module 230, a processor 232, a memory 234, storage 236 and a social graph 118.

The network interface module 230 is coupled to the network 106 by signal line 122 and coupled to the bus 220 via signal line 241. The network interface module 230 includes ports for wired connectivity such as but not limited to USB, SD, or CAT-5, etc. The network interface module 230 links the processor 232 to the network 106 that may in turn be coupled to other processing systems. The network interface module 230 provides other connections to the network 106 using standard network protocols such as TCP/IP, HTTP, HTTPS and SMTP. In other embodiments, the network interface module 230 includes a transceiver for sending and receiving signals using Wi-Fi, Bluetooth® or cellular communications for wireless communication.

The processor 232 comprises an arithmetic logic unit, a microprocessor, a general-purpose controller or some other processor array to perform computations and provide electronic display signals to a display device. The processor 232 is coupled to the bus 220 for communication with the other components via signal line 233. The processor 232 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. Other processors, operating systems, sensors, displays and physical configurations are possible.

The memory 234 stores instructions and/or data that may be executed by processor 232. In one embodiment, the memory 234 includes the social network application 104 and the spam detector 116. The memory 234 is coupled to the bus 220 for communication with the other components via signal line 235. The instructions and/or data may comprise code for performing any and/or all of the techniques described herein. The memory 234 may be a dynamic random access memory (DRAM) device, a static random access memory (SRAM) device, flash memory or some other memory device.

The storage 236 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis. In one embodiment, the storage 236 stores data, information and instructions used by the social network server 102. Such stored information includes information about users, messages, posts, photos, and other information. The storage 236 is coupled by the bus 220 for communication with other components 104, 116, 118, 230, 232 and 234 of the social network server 102 via signal line 239.

The social network application 104 is software or routines operationally stored in the memory 234 for implementing a social network structure as has been described above. The social network application 104 maintains records of a user's interests, friends, and provides an area in which to post messages, photos, videos and other content. The social network application 104 also processes interactions with the social network and other systems. Using those interactions and information, social network presents a stream of content that is tailored to the interests of the user. This stream of content can include messages, photos, videos, online service pages and other content from other users and friends of the user.

The social graph 118 is storage for storing the social graphs of a plurality of users. In some examples, the social graph 118 is a mapping of users of a social network and how they are related to one another as has been described above.

Example Spam Detectors

Figure 2B:
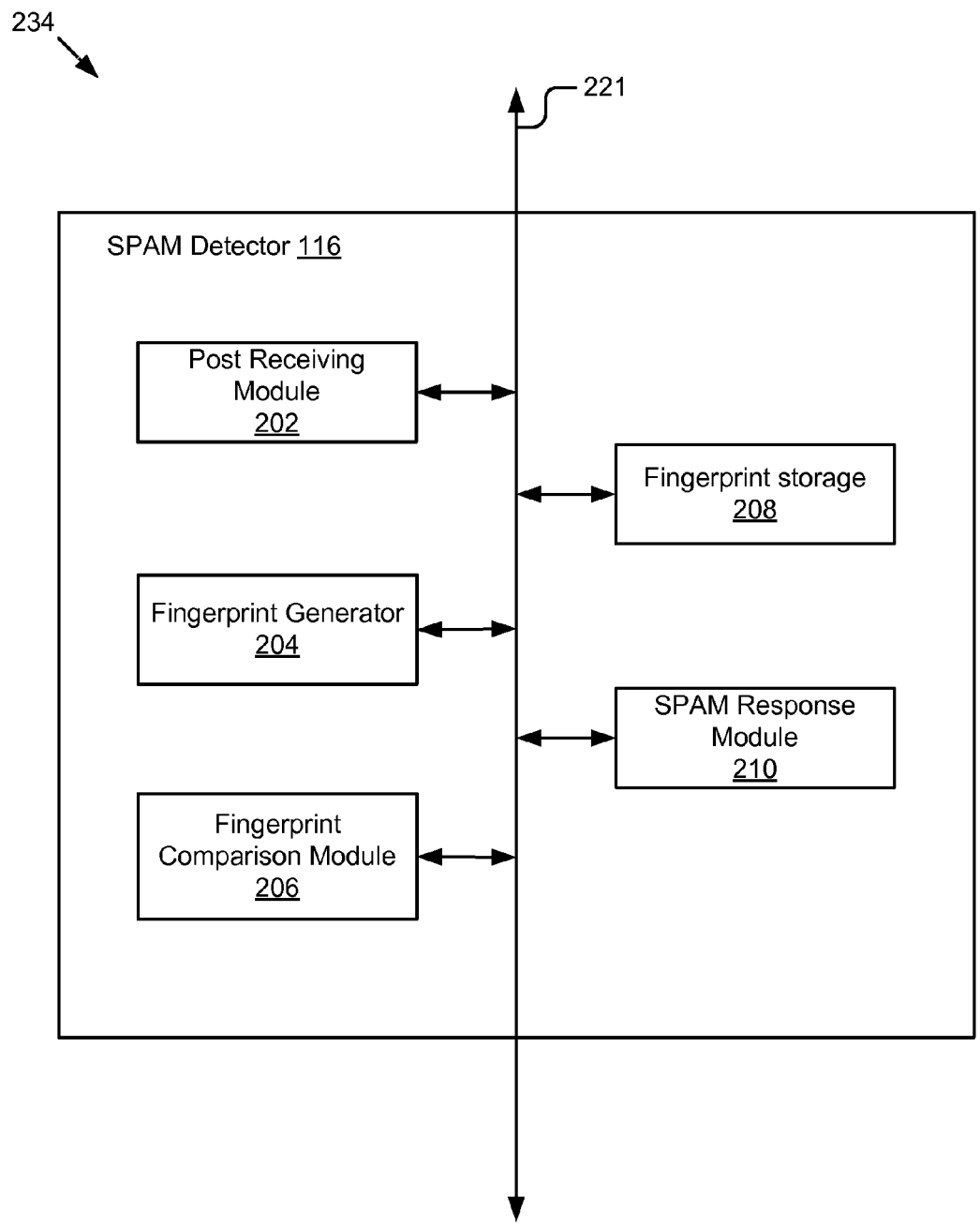
FIG. 2B is a block diagram illustrating a spam detector according to some embodiments of the present disclosure.

Referring now to FIG. 2B, the spam detector 116 is shown in greater detail. In some embodiments, the spam detector 116 includes a post receiving module 202, a fingerprint generator 204, a fingerprint comparison module 206, fingerprint storage 208 and a spam response module 210 that communicate over the software communication mechanism 221. Software communication mechanism 221 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, such as a network, the Internet, a bus 220, a combination thereof, etc.

One function of the spam detector 116 is to prevent content from being posted or transmitted in the social network. Other functions of the spam detector 116 include performing actions to remove abusive users from the social network. These components 202, 204, 206, 208 and 210 are coupled to the software communication mechanism 221 for communication with each other and the other components 104, 118, 230, 232, 234 and 236 of the social network server 102. The operation of these modules 202, 204, 206, 208 and 210 will be described in more detail below with reference to FIGS. 3-4B.

The post receiving module 202 can be software, code or routines for receiving and processing content before it is posted or made available on the social network. In some embodiments, the post receiving module 202 acts as a controller to control the processing of the comments by the other modules 204, 206, 208 and 210 of the spam detector 116. In particular, the post receiving module 202 receives comments and processes them as will be described in more detail below to determine whether they should be posted to the social network. The post receiving module 202 may also identify the user submitting the post. This information can be used to optimize the processing of the comment by limiting the comparison to other comments that the same user has posted. The comments can include text, videos, photos, audio, etc. The post receiving module 202 is coupled by the software communication mechanism 221 for communication and interaction with the other modules 204, 206, 208 and 210 of the spam detector 116.

The fingerprint generator 204 can be software, code or routines for generating a fingerprint from content. More specifically, the fingerprint generator 204 receives a comment from the post receiving module 202 and generates a fingerprint of the comment. In some embodiments, the fingerprint generator 204 generates a cryptographic hash using the comment as input. In some embodiments, the fingerprint generator 204 uses the comment and a lossy hash to generate the fingerprint. The fingerprint generator 204 provides the fingerprint to the fingerprint comparison module 206. In some embodiments, the fingerprint generator 204 also provides the fingerprint to the fingerprint storage 208 so that it may be stored for later use. The fingerprint generator 204 is coupled by the software communication mechanism 221 for communication and interaction with the other modules 202, 206, 208 and 210 of the spam detector 116.

The fingerprint comparison module 206 can be software, code or routines for comparing a fingerprint corresponding to a comment to fingerprints of comments that have already been posted to the social network or are in the process of being posted to the social network. The fingerprint comparison module 206 is coupled to receive a fingerprint for a comment that is being considered for posting a publication to the social network. The fingerprint comparison module 206 is also coupled to retrieve fingerprints of previously posted comments from the fingerprint storage 208. The fingerprint comparison module 206 compares the fingerprints to determine whether this particular user is attempting to post a comment that is similar or identical to comments that the user has posted before or that others have posted before. If a comment has the same fingerprint as other comments that have been posted to the social network, it is presumed to be spam and provided to the spam response module 210 for further processing. On the other hand, if the comment does not have the same or similar fingerprint, the spam detector 116 sends the comment to the social network application 104 for posting on the social network. The fingerprint comparison module 206 is coupled by the software communication mechanism 221 for communication and interaction with the other modules 202, 204, 208 and 210 of the spam detector 116.

The fingerprint storage 208 is data storage for storing fingerprints of comments that have been posted. In some embodiments, the fingerprint storage 208 stores fingerprints of comments that have been posted to the social network. The fingerprint storage 208 may also store fingerprints that have been generated by the fingerprint generator 204 but not yet posted to the social network. In some embodiments, the fingerprints are grouped by user so that a fingerprint for an incoming comment can be quickly compared to fingerprints for other comments posted by that user. The fingerprint storage 208 can be a volatile memory or a non-volatile memory or a similar storage device as has been described above. In some embodiments, the fingerprint storage 208 may be a part of the memory 234 or the storage 236. The fingerprint storage 208 is coupled to the software communication mechanism 221 for communication and interaction with the other modules 202, 204, 206 and 210 of the spam detector 116.

The spam response module 210 can be software, code or routines for performing further processing on a comment that is identified as possibly being spam. The spam response module 210 can take a variety of different actions including rejecting the comment for posting, performing automated or manual review of the user's post, silencing the user or disabling the user's account. The spam response module 210 is coupled to the fingerprint comparison module 206 to receive a signal indicating whether a comment is suspected to be spam. The spam response module 210 is also coupled to the post receiving module 202 to receive information identifying the comment and the user associated with the comment. The spam response module 210 may also receive additional signals to help determine whether the comment is spam. The spam response module 210 also cooperates with the social network application 104 to perform the actions identified above, typically in accordance with a predefined policy. The spam response module 210 is coupled to the software communication mechanism 221 for communication and interaction with the other modules 202, 204, 206 and 208 of the spam detector 116.

One or more of the post receiving module 202, the fingerprint generator 204, the fingerprint comparison module 206, the fingerprint storage 208 and the spam response module 210 are executable on the processor 232; store data that, when executed by the processor 232, causes the modules to perform the operations described herein; are instructions executable by the processor 232 to provide the functionality described herein; or are stored in the memory 234 of the social network server 102 and are accessible and executable by the processor 232.

Example Methods

Figure 3:
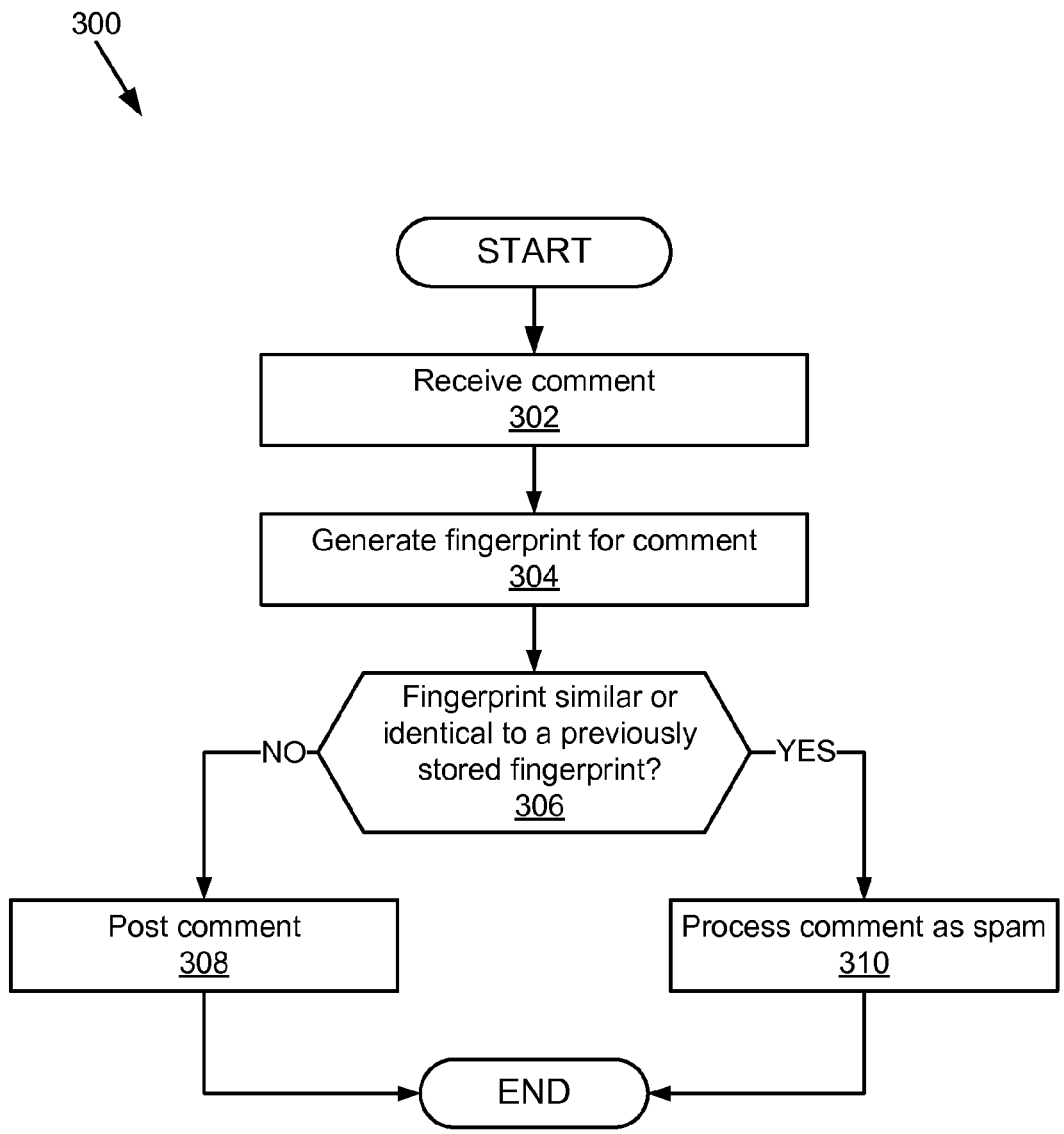
FIG. 3 is a flow diagram of a method for detecting spam across a social network according to some embodiments of the present disclosure.
Figure 4A:
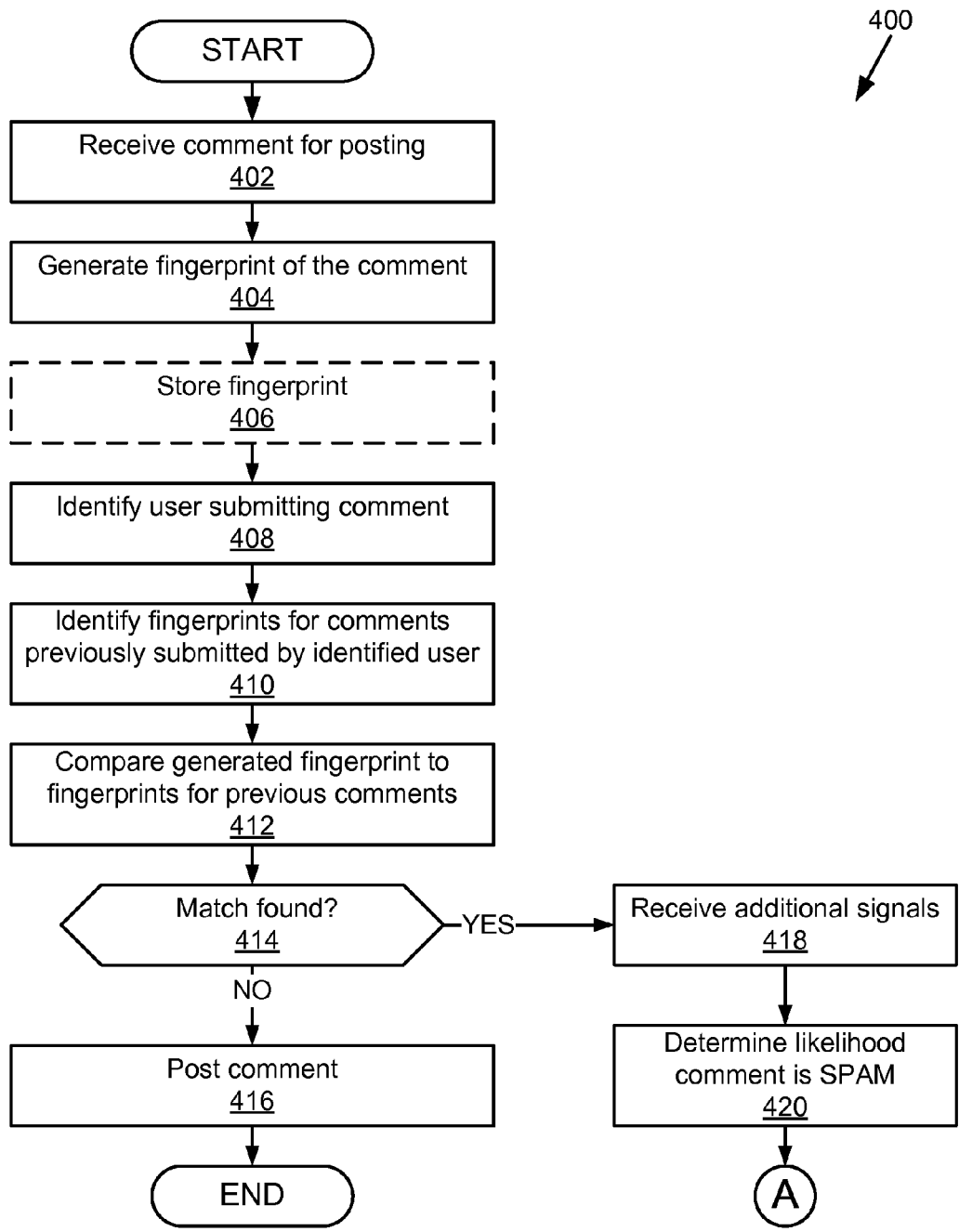
FIGS. 4A and 4B are flow diagrams of a method for detecting spam across a social network according to some embodiments of the present disclosure.
Figure 4B:
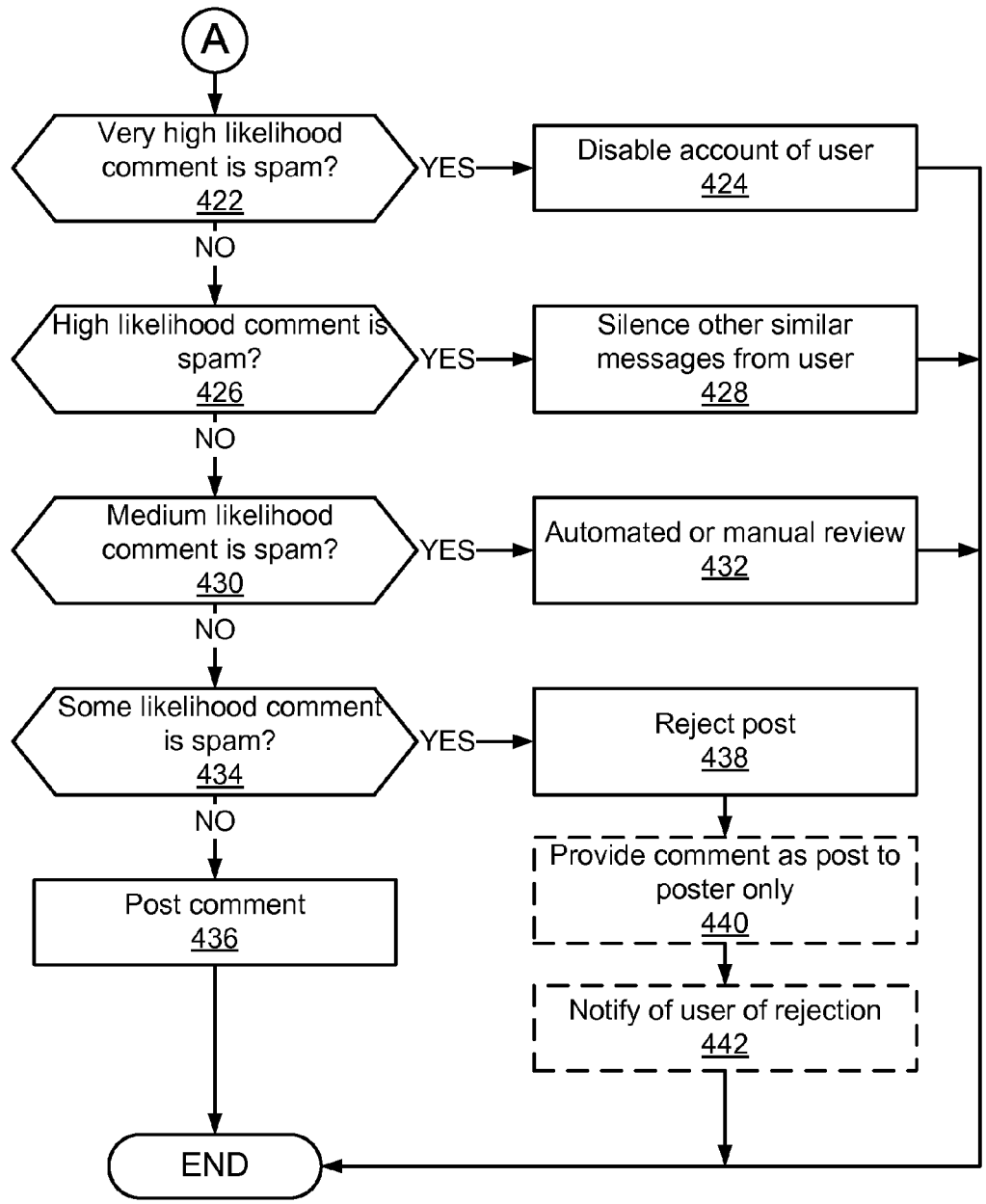

Referring now to FIG. 3-4B, various embodiments of the methods for detecting spam across a social network will be described. FIG. 3 is a flow diagram of one embodiment of a method 300 for detecting spam across a social network. The method 300 begins by receiving 302 a comment that a user would like to post. Before accepting the user's comment for posting, the method 300 generates 304 a fingerprint for the comment. For example, the fingerprint generator 204 generates a hash of the comment. The method 300 continues to determine 306 if the generated fingerprint is similar or identical to a previously stored or received fingerprint. If the fingerprint does not match the previously stored fingerprint, then the method 300 continues to post 308 the comment on the social network. However, if the fingerprint matches the previously stored fingerprint, the spam detector 116 has identified that it is a duplicate comment. This may be an innocent error or it may be a spam attempt. If a post of an accepted comment is the same as that of the proposed comment being considered, the proposed comment can be considered as being a duplicate made in error. On the other hand, if the proposed comment is to a different original post, the likelihood of the comment being made in error is much lower and the present method identifies the user as a potential spammer. The method 300 continues to process 310 the proposed comment as spam. As has been noted above, this additional processing may reject the comment for posting, perform automated or manual review of the user's post, silence the user or disable the user's account.

Referring now to FIGS. 4A and 4B, one embodiment of a method 400 for detecting spam across a social network is described. The method 400 begins by receiving 402 a comment for posting. In some embodiments, the method 400 both receives the comment that is to be posted and identifies the original post to which the comment relates. The method 400 continues by generating 404 a fingerprint of the comment. The fingerprint may be a cryptographic hash or a lossy hash of the comment itself. In some embodiments, the method 400 then stores 406 the fingerprint. For example, the generated fingerprint may be stored in the fingerprint storage 208. Next, the method 400 identifies 408 the user that is submitting the comment. Then the method 400 identifies 410 fingerprints for comments previously submitted by the identified user. For example, the fingerprint comparison module 206 can access the fingerprint storage 208 and retrieve the fingerprints for any comments posted by the identified user. Then the method 400 compares 412 the generated fingerprint to the fingerprints for previous comments identified and retrieved. The method 400 continues by determining 414 whether there is a match between the generated fingerprint and the fingerprints for previous comments—whether the fingerprint is similar or identical to the previously stored fingerprints. If there was not a match, the method 400 continues and posts 416 the comment to the social network and ends.

On the other hand, if in block 414 a match was found, the method continues to receive 418 additional signals. It should be understood that in some embodiments receiving 418 additional signals is optional. In block 418, the method 400 receives additional signals that can be used to detect similar but not identical posts or identical posts across multiple user accounts. For example, the method 400 can create a word graph by counting identical words weighted by the order that they appear and compare those results across multiple posts by the same or different users. Specific links that appear across posts could also be used as a signal that the post or comment itself is spam depending on the frequency that the link appears and its ranking or trust score in an online service search index. Next, the method 400 determines 420 a likelihood that this comment is spam. In some embodiments, the fingerprint comparison module 206 can make this determination. The method 400 determines the likelihood that a comment is spam by applying various rules such as those identified above as well as other policies to categorize comments based on the signals associated with that comment. In some embodiments, there are different categories of likelihood that a comment is spam. For example, as shown in FIG. 4B, there are five different categories and each has a different corresponding action that the spam response module 210 will perform based upon the categorization. It should be understood that the categorization scheme shown in FIG. 4B is merely one example, and that there may be a variety of other examples with fewer or more categories and different actions associated with each category.

Referring now to FIG. 4B, after block 420, the method 400 continues by determining 422 whether there is a very high likelihood that the comment is spam. For example, if there have been a number of duplicate comments from this user, and they are all within a very short timeframe, or the user account location is identified as one often used by spammers, there may be a very high likelihood that the comment is spam. If so, the method 400 disables 424 the account of the user and the method 400 ends.

On the other hand, if the comment does not have a very high likelihood of being spam, the method 400 continues to determine 426 whether there is a high likelihood that the comment is spam. In this category, there may be less certainty that the comment is spam but there is still a high probability that the comment is spam. If there is a high likelihood that the comment is spam, the method 400 silences 428 other similar messages from this user. In some embodiments, the social network application 104 processes messages from the user so that they appear to the user as if they are being posted, but they are only being posted to the user's stream of content and not to other users of the social network. This provides the spam detector 116 additional time to review subsequent messages posted by the user to determine whether to take a more severe action such as disabling the account.

If the comment does not have a high likelihood of being spam, the method 400 continues to determine 430 whether there is a medium likelihood that the comment is spam. If so, the account of the user is subject to review 432. In some embodiments, the account of the user (the comments and posts that have been made by the user) is reviewed in an automated fashion to determine whether the user is the author of a number of spam posts. In some embodiments, the review of the user's behavior can be a manual review by a human being of messages sent and posts made by the user. In yet other embodiments, the comments and posts of the user receive both the manual and automated review. After review of the user's behavior on the social network, the method 400 ends.

If the comment does not have a medium likelihood of being spam, the method 400 finally determines 434 whether there is some likelihood that the comment may be spam. If not, the method 400 sends the comment to the social network application 104 and posts 436 the comment. On the other hand, if there is some likelihood that the comment is spam, the post is rejected 438. Optionally, the comment may be displayed 440 to the user (poster) but not displayed to others in the social network. Further, the user may be optionally notified 442 of the rejection.

Additional Embodiments

Systems and methods for detecting spam across a social network have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in one embodiment below with reference to user interfaces and particular hardware. Moreover, the technologies are disclosed above primarily in the context of a social network server; however, the disclosed technologies apply to other data sources and other data types (e.g., collections of other resources such as images, audio, online service pages) that detect and extend user engagement with content.

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self consistent sequence leading to a result. The sequence may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CDROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In one embodiment, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required methods. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present invention can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method for detecting spam across a social network, the method comprising:
   receiving, using one or more computing devices, a post to a social network, the post being from a first user account in the social network, the post having at least one intended recipient user account in the social network;
   generating, using the one or more computing devices, a digital fingerprint from the post;
   determining, using the one or more computing devices, whether the digital fingerprint of the post is similar to previously stored digital fingerprints of posts to the social network;
   when it is determined that the digital fingerprint of the post is not similar to the previously stored digital fingerprints of posts, providing, using the one or more computing devices, the post to the at least one intended recipient user account in the social network; and
   when it is determined that the digital fingerprint of the post is similar to the previously stored digital fingerprints of posts, determining, using the one or more computing devices, whether the post is intentional spam based on categories of likelihood of being spam, each category of likelihood of being spam corresponding to a probability of the post being spam, and processing, using the one or more computing devices, the post based on the categories of likelihood.

2. The method of claim 1, wherein determining whether the post is intentional spam comprises receiving and processing additional signals about the post or a user of a social network that submitted the comment.

3. The method of claim 2, wherein the additional signals include one from the group of a count of identical words weighted by the order that they appear, comparison of word counts across multiple users, links that appear across posts, frequency of links in posts, and ranking or trust score in an online service search index.

4. The method of claim 1, further comprising:
   identifying a user of a social network that submitted the post;
   identifying a second digital fingerprint for a second post previously submitted by the identified user; and
   wherein determining whether the digital fingerprint of the post is similar to the previously stored digital fingerprints of posts comprises determining whether the digital fingerprint of the post is similar to the second digital fingerprint.

5. The method of claim 1, wherein providing the post comprises providing the post publicly in a social network.

6. The method of claim 1, wherein the digital fingerprint is a cryptographic hash of the post.

7. The method of claim 1, wherein the digital fingerprint is a lossy hash of the post.

8. The method of claim 1, wherein processing the post comprises one from the group of: disabling an account of a user; silencing other similar messages from a user; initiating automated review of posts by a user; initiating manual review of posts by a user; rejecting the post; providing the comment as a post only to the author; notifying a poster of rejection of the comment; and posting the comment.

9. The method of claim 1, wherein determining whether the post is the intentional spam comprises:
   categorizing the post into the categories of likelihood of being spam based on one from the group of on a number of existing duplicate posts from a poster that submitted the post, a timeframe of existing duplicate posts, a user location of the poster, and a duplication of original posts to which the post and a matching post relate, wherein the digital fingerprint of the post matches a previously stored digital fingerprint of the matching post.

10. A computer program product comprising a non-transitory computer usable medium including a computer readable program, wherein the computer readable program when executed on a computer causes the computer to:
    receive a post to a social network, the post being from a first user account in the social network, the post having at least one intended recipient user account in the social network;
    generate a digital fingerprint from the post;
    determine whether the digital fingerprint of the post is similar to previously stored digital fingerprints of posts to the social network;
    when it is determined that the digital fingerprint of the post is not similar to the previously stored digital fingerprints of posts, provide the post to the at least one intended recipient user account in the social network; and when it is determined that the digital fingerprint of the post is similar to the previously stored digital fingerprints of posts, determine whether the post is an intentional spam based on categories of likelihood of being spam, each category of likelihood of being spam corresponding to a probability of the post being spam, and process the post based on the categories of likelihood.

11. The computer program product of claim 10, wherein determining whether the post is intentional spam comprises receiving and processing additional signals about the post or a user of a social network that submitted the comment.

12. The computer program product of claim 11, wherein the additional signals include one from the group of a count of identical words weighted by the order that they appear, comparison of word counts across multiple users, links that appear across posts, frequency of links in posts, and ranking or trust score in an online service search index.

13. The computer program product of claim 10, wherein the computer readable program when executed on the computer causes the computer to also:
    identify a user of a social network that submitted the post;
    identify a second digital fingerprint for a second post previously submitted by the identified user; and
    wherein the determination of whether the digital fingerprint of the post is similar to the previously stored digital fingerprints of posts includes a determination of whether the digital fingerprint of the post is similar to the second digital fingerprint.

14. The computer program product of claim 10, wherein the computer readable program when executed on the computer causes the computer to provide the post publicly in a social network.

15. The computer program product of claim 10, wherein the digital fingerprint is a cryptographic hash of the post.

16. The computer program product of claim 10, wherein the digital fingerprint is a lossy hash of the post.

17. The computer program product of claim 10, wherein processing the post comprises one from the group of: disabling an account of a user; silencing other similar messages from a user; initiating automated review of posts by a user; initiating manual review of posts by a user; rejecting the post; providing the comment as a post only to the author; notifying a poster of rejection of the comment; and posting the comment.

18. A system for detecting spam across a social network, the system comprising:
    one or more processors; and
    memory storing instructions that when executed by the one or more processors cause the system to:
        receive a post to a social network, the post being from a first user account in the social network, the post having at least one intended recipient user account in the social network;
        generate a digital fingerprint from the post;
        determine whether the digital fingerprint of the post is similar to previously stored digital fingerprints of posts to the social network;
        when it is determined that the digital fingerprint of the post is not similar or not identical to the previously stored digital fingerprints of posts, provide the post to the at least one intended recipient user account in the social network; and
        when it is determined that the digital fingerprint of the post is similar to the previously stored digital fingerprints of posts, determine whether the post is intentional spam based on categories of likelihood of being spam, each category of likelihood of being spam corresponding to a probability of the post being spam, and process the post based on the categories of likelihood.

19. The system of claim 18, wherein determining whether the post is intentional spam comprises receiving and processing additional signals about the post or a user of a social network that submitted the comment.

20. The system of claim 19, wherein the additional signals include one from the group of a count of identical words weighted by the order that they appear, comparison of word counts across multiple users, links that appear across posts, frequency of links in posts, and ranking or trust score in an online service search index.

21. The system of claim 18, wherein the one or more processors are further configured to:
    identify a user of a social network that submitted the post;
    identify a second digital fingerprint for a second post previously submitted by the identified user; and
    wherein the determination of whether the digital fingerprint of the post is similar to the previously stored digital fingerprints of posts includes a determination of whether the digital fingerprint of the post is similar to the second digital fingerprint.

22. The system of claim 18, wherein the one or more processors are further configured to provide the post publicly in a social network.

23. The system of claim 18, wherein the digital fingerprint is a cryptographic hash of the post.

24. The system of claim 18, wherein the digital fingerprint is a lossy hash of the post.

25. The system of claim 18, wherein processing the post comprises one from the group of: disabling an account of a user; silencing other similar messages from a user; initiating automated review of posts by a user; initiating manual review of posts by a user; rejecting the post; providing the comment as a post only to the author; notifying a poster of rejection of the comment; and posting the comment.

* * * * *